US010584238B2

(12) United States Patent
Strand et al.

(10) Patent No.: US 10,584,238 B2
(45) Date of Patent: Mar. 10, 2020

(54) FIBER REINFORCED POLYVINYL CHLORIDE AND COPOLYESTER COMPOSITIONS AND ARTICLES MADE USING THESE COMPOSITIONS

(71) Applicant: Eastman Chemical Company, Kingsport, TN (US)

(72) Inventors: Marc Alan Strand, Kingsport, TN (US); Robert Erik Young, Kingsport, TN (US); Mark Allan Treece, Jonesborough, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 16/376,265

(22) Filed: Apr. 5, 2019

(65) Prior Publication Data

US 2019/0233632 A1    Aug. 1, 2019

Related U.S. Application Data

(62) Division of application No. 15/628,743, filed on Jun. 21, 2017, now Pat. No. 10,308,799.

(51) Int. Cl.
| | | |
|---|---|---|
| *C08L 67/02* | (2006.01) | |
| *C08L 27/06* | (2006.01) | |
| *C08J 5/04* | (2006.01) | |
| *C08J 5/18* | (2006.01) | |
| *C08G 63/183* | (2006.01) | |

(52) U.S. Cl.
CPC ............ *C08L 27/06* (2013.01); *C08G 63/183* (2013.01); *C08J 5/043* (2013.01); *C08J 5/18* (2013.01); *C08L 67/02* (2013.01)

(58) Field of Classification Search
None
See application file for complete search history.

(56) References Cited

U.S. PATENT DOCUMENTS

| | | |
|---|---|---|
| 3,772,405 A | 11/1973 | Hamb |
| 4,755,699 A | 7/1988 | Schmider |
| 5,248,546 A | 9/1993 | Greenlee |
| 5,654,347 A | 8/1997 | Khemani et al. |
| 5,696,176 A | 12/1997 | Khemani et al. |
| 6,632,390 B1 | 10/2003 | Shelby et al. |
| 8,822,020 B2 | 9/2014 | Grigo et al. |

FOREIGN PATENT DOCUMENTS

| | | | |
|---|---|---|---|
| CN | 103 881 260 A | 6/2014 | |
| DE | 100 22 997 A1 | 11/2001 | |
| EP | 0 212 449 A2 | 3/1987 | |
| EP | 212449 A2 * | 3/1987 | .............. C08L 27/06 |
| EP | 0 229 487 A1 | 7/1987 | |
| EP | 229487 A1 * | 7/1987 | .............. C08L 67/02 |
| EP | 0 744 439 A1 | 11/1996 | |
| EP | 1 066 339 B1 | 10/2003 | |
| JP | H03 86734 A | 4/1991 | |
| JP | 2001 294732 A | 10/2001 | |
| JP | 2001294732 A * | 10/2001 | .............. C08L 67/02 |
| JP | 3577614 | 10/2004 | |
| WO | WO 2016 069673 A1 | 5/2016 | |

OTHER PUBLICATIONS

Computer-generated English-language translation of JP2001294732A.*
Butschli, Jim; "Gauging demand for calendered plastics"; Packaging World, May 31, 1997; retrieved from https://www.packworld.com/article/machinery/fillingsealing/dry-filling/guaging-demand-calendered-plastics on Jun. 18, 2018; 4 pages.
Crocker, Zenas and Gupta, Ved P.; "Chapter 3 Solid Vinyl Compound Systems"; Encyclopedia of PVC, Second Edition, Revised and Expanded, vol. 3: Compounding Processes, Product Design, and Specifications; 1992; pp. 99-123.
Hanson, Ben et al.; "The Influence of Copolyester Composition on Adhesion to Soda-Lime Glass via Molecular Dynamics Simulations"; ACS Applied Materials & Interfaces, 8(21); Jun. 1, 2016, pp. 13583-13589.
Summers, James W.; "Vinyl Chloride Polymers"; Kirk-Othmer Encyclopedia of Chemical Technology, Fourth Edition, vol. 24; 1997; pp. 1017-1053.
Titow, W. V.; "Chapter 18 Calendering of PVC"; PVC Technology, Fourth Edition; 1984; pp. 803-848.
Invitation to Pay Additional Fees and, Where Applicable, Protest Fee received in International Patent Application No. PCT/US2018/036233 dated Sep. 26, 2018.
Notification of Transmittal of the International Search Report and the Written Opinion of the International Searching Authority, or the Declaration dated Jan. 3, 2019 received in International Application No. PCT/US2018/036233.

* cited by examiner

Primary Examiner — Vu A Nguyen
(74) Attorney, Agent, or Firm — Tammye L. Taylor

(57) ABSTRACT

This disclosure pertains to fiber reinforced polyvinyl chloride compositions which comprise fibrous materials, at least one polyvinyl chloride resins and at least one high Tg copolyester. Processes for producing the novel fiber reinforced polyvinyl chloride compositions as well as articles made using these compositions.

29 Claims, No Drawings

FIBER REINFORCED POLYVINYL CHLORIDE AND COPOLYESTER COMPOSITIONS AND ARTICLES MADE USING THESE COMPOSITIONS

CROSS-REFERENCE TO RELATED APPLICATION

This application is a divisional of U.S. patent application Ser. No. 15/628,743, filed on Jun. 21, 2017, now U.S. Patent Publication Number 2018-0371225, the disclosure of which is incorporated herein by reference in its entirety.

FIELD

This disclosure pertains to novel polyvinyl chloride compositions. More particularly, this disclosure pertains to novel compositions containing fibrous materials, polyvinyl chloride resins and copolyesters. More particularly, the present disclosure pertains to fiber-reinforced polyvinyl chloride compositions including fibrous materials and high glass transition temperature (Tg) copolyesters to increase the Tg or the heat distortion temperature (HDT) of the polyvinyl chloride compositions.

BACKGROUND

Fiber-reinforced polyvinyl chloride (PVC) compositions are difficult to make due to the incompatibility of the fibrous materials such as glass fibers in the PVC matrix and the processing difficulties, such as increased melt viscosity, that leads to thermal degradation of the PVC during processing. The compositions of the present disclosure overcome these processing difficulties and allow for a wider range of processing methods to be used including calendering, injection molding, and profile and sheet extrusion. Also, historically, commercially available glass fiber filled PVC formulations have been limited to a glass fiber content of 30% or less. The improved compositions and processing methods in the present disclosure allow for fiber content up to 65% thus improving the physical properties, such as tensile and flexural modulus, of the PVC compositions.

BRIEF SUMMARY

The fiber reinforced polyvinyl chloride compositions of the present disclosure comprise at least one polyvinyl chloride resin, fibrous materials and at least one copolyester.

In one embodiment, the fiber reinforced polyvinyl chloride compositions comprise at least one polyvinyl chloride resin, fibrous materials and at least one copolyester.

One embodiment of the present disclosure is a polyvinyl chloride composition comprising a polyvinyl chloride resin, fibrous materials and at least one copolyester which comprises:
(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component comprising:
  (i) about 20 to about 60 mole % of a modifying glycol consisting of 2 to 20 carbon atoms and
  (ii) about 40 to about 80 mole % of a second modifying glycol consisting of 2 to 20 carbon atoms,
wherein the total mole % of the dicarboxylic acid component is 100 mole %, and wherein the total mole % of the glycol component is 100 mole %.

One embodiment of the present disclosure is a polyvinyl chloride composition comprising a polyvinyl chloride resin, glass fibers and at least one copolyester which comprises:
(a) a dicarboxylic acid component comprising:
  (i) about 50 to about 100 mole % of terephthalic acid residues;
  (ii) about 0 to about 50 mole % of aromatic and/or aliphatic dicarboxylic acid residues having up to 20 carbon atoms; and
(b) a glycol component comprising:
  (i) about 60 to about 100 mole % of a modifying glycol consisting of 2 to 20 carbon atoms; and
  (ii) about 0 to about 40 mole % of a second modifying glycol consisting of 2 to 20 carbon atoms;
wherein the total mole % of the dicarboxylic acid component is 100 mole %, and wherein the total mole % of the glycol component is 100 mole %.

In one embodiment, the Tg of the copolyester is at least about 60° C. or higher.

In one embodiment, the Tg of the copolyester is at least about 90° C. or higher.

In one embodiment, the Tg of the copolyester is at least about 100° C. or higher.

In one embodiment, the copolyester is amorphous.

In one embodiment, the copolyester has a crystallization half time of about 5 minutes or greater.

In one embodiment, the copolyester content in the PVC composition is about 1 to about 100 parts per hundred resin (phr) based on the content of the PVC resin in the composition.

In one embodiment, the content of the fibrous materials in the PVC composition is up to about 65% by weight based on the total weight of the composition.

In another embodiment, the content of the fibrous materials in the PVC composition is greater than about 30% by weight based on the total weight of the composition.

In one embodiment, the polyvinyl chloride compositions are rigid.

One embodiment of the present disclosure is a method of producing a fiber reinforced polyvinyl chloride composition comprising:
compounding fibrous materials with a miscible admixture of at least one polyvinyl chloride resin and at least one copolyester which comprises:
(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component comprising:
  (i) about 20 to about 60 mole % of a modifying glycol consisting of 2 to 20 carbon atoms and
  (ii) about 40 to about 80 mole % of a second modifying glycol consisting of 2 to 20 carbon atoms,
to produce a viscous thermoplastic material,
extruding the compound through a die to produce pellets; and
introducing the pellets into a calendering, extrusion or injection molding process to produce fiber reinforced polyvinyl chloride articles.

One embodiment of the present disclosure is a method of producing a fiber reinforced polyvinyl chloride composition comprising:

compounding fibrous materials with at least one copolyester which comprises:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 20 to about 60 mole % of a modifying glycol consisting of 2 to 20 carbon atoms and
    (ii) about 40 to about 80 mole % of a second modifying glycol consisting of 2 to 20 carbon atoms,
to produce a viscous thermoplastic material,
  mixing the compounded composition with a polyvinyl chloride resin to create a polyvinyl chloride composition of about 1 to about 65 percent fibrous materials content based on the total weight of the composition;
  extruding the polyvinyl chloride composition through a die to produce pellets; and
  introducing the pellets into a calendering, extrusion or injection molding process to produce fiber reinforced polyvinyl chloride articles.

DETAILED DESCRIPTION

The fiber reinforced polyvinyl chloride compositions of the present disclosure comprise at least one polyvinyl chloride resin, fibrous materials and at least one copolyester.

In one embodiment, the fiber reinforced polyvinyl chloride compositions comprise at least one polyvinyl chloride resin, glass fibers and at least one copolyester.

One embodiment of the present disclosure is a polyvinyl chloride composition comprising a polyvinyl chloride resin, fibrous materials and at least one copolyester which comprises:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 20 to about 60 mole % of a modifying glycol consisting of 2 to 20 carbon atoms and
    (ii) about 40 to about 80 mole % of a second modifying glycol consisting of 2 to 20 carbon atoms,
  wherein the total mole % of the dicarboxylic acid component is 100 mole %, and wherein the total mole % of the glycol component is 100 mole %.

One embodiment of the present disclosure is a polyvinyl chloride composition comprising a polyvinyl chloride resin, fibrous materials and at least one copolyester which comprises:
  (a) a dicarboxylic acid component comprising:
    (i) about 50 to about 100 mole % of terephthalic acid residues;
    (ii) about 0 to about 50 mole % of aromatic and/or aliphatic dicarboxylic acid residues having up to 20 carbon atoms; and
  (b) a glycol component comprising:
    (i) about 60 to about 100 mole % of a modifying glycol consisting of 2 to 20 carbon atoms; and
    (ii) about 0 to about 40 mole % of a second modifying glycol consisting of 2 to 20 carbon atoms;
    wherein the total mole % of the dicarboxylic acid component is 100 mole %, and wherein the total mole % of the glycol component is 100 mole %.

Copolyesters

Any amorphous or essentially amorphous copolyesters are suitable for use in the present disclosure. For example, in one embodiment, any copolyesters can be used in this disclosure provided that they are essentially amorphous and have a minimum crystallization half-time of at least about 5 minutes, or at least about 7 minutes. In one embodiment, any copolyester can be used provided that its minimum crystallization half-time is at least about 8 minutes. In another embodiment, any copolyester can be used provided that its crystallization half-time is at least about 10 minutes. The amorphous copolyesters in the present disclosure can, in some embodiments, have crystallization half-times up to infinity. In one aspect of the present disclosure, blends the amorphous copolyesters with other polymers (including other polyesters and copolyesters) are suitable for use provided that the blend has a minimum crystallization half-time of at least about 5 minutes.

Crystallization half-times can be measured using a differential scanning calorimeter according to the following procedure. A sample of about 10.0 mg of the copolyester is sealed in an aluminum pan and heated at a rate of about 320° C./min to about 290° C. and held for about 2 minutes in a helium atmosphere. The sample is then cooled immediately at a rate of about 320° C./min to an isothermal crystallization temperature ranging from about 140° C. to about 200° C. with about a 10° C. interval. The crystallization half-time at each temperature is then determined as the time needed to reach the peak on the exothermic curve. The minimum crystallization half-time is the temperature at which the crystallization rate is the fastest.

In one embodiment of the present disclosure, the copolyester comprises
  (a) a dicarboxylic acid component comprising:
    (i) about 50 to about 100 mole % of terephthalic acid residues;
    (ii) about 0 to about 50 mole % of aromatic and/or aliphatic dicarboxylic acid residues having up to 20 carbon atoms; and
  (b) a glycol component comprising:
    (i) about 20 to about 60 mole % of a modifying glycol consisting of 2 to 20 carbon atoms and
    (ii) about 40 to about 80 mole % of a second modifying glycol consisting of 2 to 20 carbon atoms,
    wherein the total mole % of the dicarboxylic acid component is 100 mole %, and wherein the total mole % of the glycol component is 100 mole %.

In another embodiment, the copolyester comprises:
  (a) a dicarboxylic acid component comprising:
    (i) about 50 to about 100 mole % of terephthalic acid residues;
    (ii) about 0 to about 50 mole % of aromatic and/or aliphatic dicarboxylic acid residues having up to 20 carbon atoms; and
  (b) a glycol component comprising:
    (i) about 60 to about 100 mole % of a modifying glycol consisting of 2 to 20 carbon atoms; and
    (ii) about 0 to about 40 mole % of a second modifying glycol consisting of 2 to 20 carbon atoms;
    wherein the total mole % of the dicarboxylic acid component is 100 mole %, and wherein the total mole % of the glycol component is 100 mole %.

Unless the context clearly suggests otherwise, the terms "polyester" and "copolyester" are used interchangeably herein. The term "polyester" is intended to include "copolyesters" and is understood to mean a synthetic polymer prepared by the polycondensation of one or more difunctional carboxylic acids (or diacids) with one or more difunctional hydroxyl compounds (or diols). In one embodiment, the difunctional carboxylic acid is a dicarboxylic acid and the difunctional hydroxyl compound is a dihydric alcohol such as, for example, glycols and diols.

The term "residue" means any organic structure incorporated into a polymer through a polycondensation reaction involving the corresponding monomer. The term "repeating unit" means an organic structure having a dicarboxylic acid residue (or diacid component) and a diol residue (or diol component) bonded through a carbonyloxy group. Thus, the dicarboxylic acid residues may be derived from a dicarboxylic acid monomer or its associated acid halides, esters, salts, anhydrides, or mixtures thereof.

In one embodiment, the copolyesters of the present disclosure are amorphous. In one embodiment, the copolyesters of the present disclosure are essentially amorphous.

In one embodiment, the copolyesters contain repeat units from a dicarboxylic acid and a diol, based on 100 mole percent of dicarboxylic acid residues and 100 mole percent of diol residues, respectively.

In one embodiment, the diacid component contains at least about 50 mole percent of the residues of an aromatic dicarboxylic acid having about 8 to about 14 carbon atoms. The copolyester may optionally be modified with up to about 50 mole percent, based on 100 mole percent of dicarboxylic acid residues, of the residues of one or more different dicarboxylic acids other than an aromatic dicarboxylic acid, such as saturated aliphatic dicarboxylic acids having 4 to 12 carbon atoms and cycloaliphatic dicarboxylic acids having 8 to 12 carbon atoms. Specific examples of dicarboxylic acids include terephthalic acid, phthalic acid, isophthalic acid, naphthalene dicarboxylic acid, 1,4-cyclohexane dicarboxylic acid, cyclohexane diacetic acid, diphenyl-4,4'-dicarboxylic acid, succinic acid, glutaric acid, adipic acid, azelaic acid, sebacic acid, and the like. The polyester may be prepared from one or more of the above dicarboxylic acids.

It should be understood that use of the corresponding acid anhydrides, esters, and acid chlorides of these acids is included in the term "dicarboxylic acid."

In one embodiment, diol component contains at least about 60 mole percent of the residues of a diol containing 2 to 20 carbon atoms. In addition, the diol component may optionally be modified with up to about 40 mole percent, based on 100 mole percent of diol residues, of the residues of one or more other diols. Specific examples of diols include ethylene glycol, diethylene glycol, triethylene glycol, isosorbide, propane-1,3-diol, butane-1,4-diol, 2,2-dimethylpropane-1,3-diol (neopentyl glycol), 2,2,4,4,-tetramethyl-1,3-cyclobutanediol, pentane-1,5-diol, hexane-1,6-diol, 1,4-cyclohexanedimethanol, 3-methyl-pentanediol-(2,4), 2-methylpentanediol-(1,4), 2,2,4-tri-methylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane, and the like. The polyester may be prepared from one or more of the above diols.

In one embodiment, the diacid component contains at least about 90 mole percent of the residues of an aromatic dicarboxylic acid having about up to 20 carbon atoms. The copolyester may optionally be modified with up to about 10 mole percent, based on 100 mole percent of dicarboxylic acid residues, of the residues of one or more different dicarboxylic acids other than an aromatic dicarboxylic acid, such as saturated aliphatic dicarboxylic acids having 4 to 12 carbon atoms and cycloaliphatic dicarboxylic acids having 8 to 12 carbon atoms. Specific examples of dicarboxylic acids include terephthalic acid, phthalic acid, isophthalic acid, naphthalene dicarboxylic acid, 1,4-cyclohexane dicarboxylic acid, cyclohexane diacetic acid, diphenyl-4,4'-dicarboxylic acid, succinic acid, glutaric acid, adipic acid, azelaic acid, sebacic acid, and the like. The polyester may be prepared from one or more of the above dicarboxylic acids.

It should be understood that use of the corresponding acid anhydrides, esters, and acid chlorides of these acids is included in the term "dicarboxylic acid."

In one embodiment, diol component contains at least about 20 mole percent of the residues of a diol containing 2 to 20 carbon atoms. In addition, the diol component may optionally be modified with up to about 80 mole percent, based on 100 mole percent of diol residues, of the residues of one or more other diols. Specific examples of diols include ethylene glycol, diethylene glycol, triethylene glycol, isosorbide, propane-1,3-diol, butane-1,4-diol, 2,2-dimethylpropane-1,3-diol (neopentyl glycol), 2,2,4,4,-tetramethyl-1,3-cyclobutanediol, pentane-1,5-diol, hexane-1,6-diol, 1,4-cyclohexanedimethanol, 3-methyl-pentanediol-(2,4), 2-methylpentanediol-(1,4), 2,2,4-tri-methylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane, and the like. The polyester may be prepared from one or more of the above diols.

The polyester may also contain small amounts of trifunctional or tetrafunctional co-monomers such as trimellitic anhydride, trimethylolpropane, pyromellitic dianhydride, pentaerythritol, and other polyester forming polyacids or polyols generally known in the art.

In one embodiment, the copolyester comprises (i) a diacid component comprising at least about 50 mole percent of residues of terephthalic acid, naphthalenedicarboxylic acid, 1,4-cyclohexanedicarboxylic acid, isophthalic acid, or mixtures thereof; and (ii) a diol component comprising at least about 80 mole percent of residues of a diol containing 2 to 10 carbon atoms. In one embodiment, the diacid component of the copolyester comprises at least about 80 mole percent of the residues of terephthalic acid, naphthalenedicarboxylic acid, 1,4-cyclohexanedicarboxylic acid, isophthalic acid, or mixtures thereof. And in one embodiment, the diol component of the copolyester comprises the residues of ethylene glycol, 1,4-cyclohexanedimethanol, diethylene glycol, neopentyl glycol, 2,2,4,4-tetramethyl-1,3-cyclobutanediol, or mixtures thereof.

In another embodiment, the copolyester comprises (i) a diacid component comprising at least about 80 mole percent of terephthalic acid residues, and (ii) a diol component comprising at least about 80 mole percent of the residues of ethylene glycol and 1,4-cyclohexanedimethanol. In yet another embodiment, the copolyester comprises (i) a diacid component comprising at least about 80 mole percent of terephthalic acid residues, and (ii) a diol component comprising at least about 80 mole percent of the residues of ethylene glycol, 1,4-cyclohexanedimethanol, and diethylene glycol. In yet another embodiment, the copolyester comprises (i) a diacid component comprising at least about 80 mole percent of terephthalic acid residues, and (ii) a diol component comprising at least about 80 mole percent of residues of ethylene glycol and neopentyl glycol. In yet another embodiment, the copolyester comprises (i) a diacid component comprising at least about 80 mole percent of terephthalic acid residues, and (ii) a diol component comprising at least about 80 mole percent of the residues of 1,4-cyclohexanedimethanol and 2,2,4,4-tetramethyl-1,3-cyclobutanediol.

Copolyesters useful in the present disclosure can have an inherent viscosity of about 0.40 to about 1.2 dL/g. As used, herein inherent viscosity (or IhV) is the viscosity of a dilute solution of the polymer, specifically IhV is the viscosity of a 60/40 (wt %/wt %) phenol/tetrachloroethane at a concentration of about 0.25 g polyester per 50 ml solution at about 25° C. or about 30° C. as determined by ASTM 4603. This viscosity measurement is representative of the polymer's molecular weight.

For example, in one embodiment, the copolyester has an inherent viscosity of about 0.45 to about 0.9 dL/g or about 0.60 to about 0.90 as measured at about 25° C. using 0.50 grams of polymer per 100 mL of a solvent consisting of 60% by weight of phenol and 40% by weight of tetrachloroethane.

In one embodiment, copolyesters useful in the present disclosure have a glass transition temperature of about 30° C. to about 140° C. For example, in one embodiment, the glass transition temperature of the copolyesters is about 60° C. to about 120° C. In another embodiment, copolyesters useful in the present disclosure have a glass transition temperature of at least about 60° C. For example, in one embodiment, the copolyesters have a glass transition temperature of at least about 90° C. and in another embodiment, the glass transition temperature about 100° C.

The copolyester may be prepared by conventional polycondensation procedures well-known in the art. Such processes include direct condensation of the dicarboxylic acid(s) with the diol(s) or by ester interchange using a dialkyl dicarboxylate. For example, a dialkyl terephthalate such as dimethyl terephthalate is ester interchanged with the diol(s) at elevated temperatures in the presence of a catalyst. The polyesters may also be subjected to solid-state polymerization methods. Suitable methods include the steps of reacting one or more dicarboxylic acids with one or more glycols at a temperature of about 100° C. to about 315° C. at a pressure of about 0.1 to about 760 mm Hg for a time sufficient to form a polyester. See U.S. Pat. No. 3,772,405 for methods of producing polyesters, the disclosure of such methods which is incorporated herein by reference.

The copolyesters suitable for use in the present disclosure may be obtained commercially from Eastman Chemical Company.

Polyvinyl Chloride

Any polyvinyl chloride ("PVC") polymer resin is suitable for use in the present disclosure. For example, in one embodiment polyvinyl chloride polymers useful in the present disclosure include those described in the "Vinyl Chloride Polymers" entry of Kirk-Othmer Encyclopedia of Chemical Technology, Vol. 24 4th ed., (1997) pp. 1017-1053, which is incorporated herein by reference.

In some embodiments, in the present disclosure, suitable PVC polymers include homopolymers of polyvinyl chloride resin(s), copolymers of polyvinyl chloride resin(s), and mixtures thereof.

In some embodiments, the polyvinylchloride resins are polyvinylchloride resins, chlorinated polyvinylchloride resins, or alloys thereof.

In some embodiments, copolymers of vinyl chloride are formed by the copolymerization of vinyl chloride and other monomers or monomer blends. In some embodiments, suitable monomers include vinyl acetate, ethylene, propylene, maleate, methacrylate, acrylate, high alcohol vinyl ester, urethane, chlorinated urethane, methylmethacrylate, and mixtures thereof. In some embodiments, examples of monomer blends include ethylene-vinyl acetate copolymer, acrylonitrile-butadiene-styrene terpolymer, acrylonitrile-butadiene copolymer, and mixtures thereof.

For example, in some embodiments, PVC polymers useful according to this disclosure include homopolymers of vinyl chloride and those vinyl chloride polymer resins having at least about 70 wt. % repeating units polymerized from a vinyl chloride monomer, or at least about 80 wt, %, or at least about 90 wt. %, or even about 95 wt. % or more of repeating units polymerized from a vinyl chloride monomer.

In some embodiments, the polyvinyl chloride polymer compositions of the present disclosure may comprise repeating units polymerized from a vinyl chloride monomer, and may also include comonomers up to about 30 weight percent of the copolymer from, without limitation, one or more of: the esters of acrylic acid, for example, methyl acrylate, ethyl acrylate, butyl acrylate, octyl acrylate, cyanoethyl acrylate, and the like; vinyl esters such as vinyl acetate and vinyl propionate; esters of methacrylic acid, such as methyl methacrylate, ethyl methacrylate, hydroxyethyl acrylate, butyl methacrylate, and the like; nitriles, such as acrylonitrile and methacrylonitrile; acrylamides, such as methyl acrylamide, N-methylol acrylamide, N-butoxy methacrylamide, and the like; halogen containing vinyl monomers such as vinylidene chloride vinylidene fluoride, and vinyl bromide; vinyl ethers such as ethylvinyl ether, chloroethyl vinyl ether and the like; the vinyl ketones, styrene derivatives including α-methyl styrene, vinyl toluene, chlorostyrene; vinyl naphthalene; olefins such as ethylene, butene, isobutylene, propylene and hexene; and other copolymerizable monomers or mixtures of monomers having suitable reactivity ratios with vinyl chloride as known to those skilled in the art.

In one embodiment, the copolymers can include without limitation vinyl chloride-vinyl acetate copolymers, vinyl chloride-vinylidene chloride copolymers, vinyl chloride maleate and fumarate copolymers, vinyl chloride-olefin copolymers, vinyl chloride-acrylonitrile copolymers, and the like, and combinations thereof.

Some embodiments of the present disclosure may employ PVC blends with crosslinked PVC or crosslinked PVC alone. Crosslinked PVC polymers can be made by polymerizing vinyl chloride in the presence of cross-linking monomers such as the aforementioned diallyl phthalate, trimethylol propane triacrylate, allyl methacrylate, and the like, as taught in U.S. Pat. Nos. 4,755,699 and 5,248,546, the relevant portions of which are incorporated herein by reference.

The described homopolymers and copolymers are commercially available and may be produced by any suitable polymerization method including suspension, dispersion or blending. For example, in one embodiment, polyvinyl chloride polymers prepared using suspension processes are suitable for use in the present disclosure.

In some embodiments, the PVC compositions are rigid. Any rigid PVC compositions are suitable for use in the present disclosure. For example, in some embodiments, the rigid compositions are unmodified or unplasticized or the PVC contains small amounts or no plasticizer. In some embodiments, the rigid compositions contain about 12 phr or less of plasticizers or plasticizing additives. Whereas, flexible or plasticized PVC, typically may include plasticizers at levels greater than about 12 phr. Thus, rigid PVC according to the present disclosure is characterized by a having a higher level of tensile strength than modified PVC compositions that are classified as flexible. As used herein, "parts per hundred parts resin defines the quantity of the components based on the weight of the resin and is abbreviated "phr".

Also, according to the present disclosure, rigid PVC refers to the property of a given compound having more than a certain tensile modulus. For example, PVC may be characterized as rigid when it has a tensile modulus that exceeds about 105 psi (or about 689 MPa), and semirigid when its tensile modulus falls between about 105 psi and about 3000 psi (about 20.7 MPa), and flexible when it has a tensile modulus that is less than about 3000 psi (or about 20.7 MPa) (the tensile modulus values are based on standard ASTM conditions of 23° C. and 50% relative humidity). Therefore, rigid PVC according to the present disclosure may have tensile modulus values that vary over a wide range, for example, the tensile modulus values may be from about 800 MPa to about 1000 MPa, or from about 1000 MPa up to about 2000 MPa or even up to 3000 MPa or greater.

In some the embodiments, the PVC compositions of the present disclosure are suitable for use in a variety of applications including, for example, building and construction, corner profiles, decking, fencing, railings, soffits, vinyl siding, cladding, window profiles, door frames, siding, fences, gutters, pipes, piping, appliances, electrical and electronic enclosures, electrical junction boxes, automobile interiors and exteriors, appliances, office equipment, sign enclosures, medical devices, aircraft interiors, and other applications.

In some embodiments, the polyvinyl chloride resin compositions contain additives such as processing aids, plasticizers, stabilizers, impact modifiers, biocides, flame retardants, foaming agents, blowing agents, ultraviolet light stabilizers, ultraviolet light absorbers, thermal stabilizers, minerals, pigments, dyes, colorants, fillers, waxes, fusion promoters, antioxidants, antistatic agents, release agents, lubricants, additional resins, heat distortion temperature modifiers, and possibly other additives. In some embodiments, the amount of polyvinyl chloride in the commercially available rigid polyvinyl chloride resin compositions used are typically is less than about 100%.

Any of the types of PVC resins known in the art can be useful as a component of the compositions of the disclosure. In some embodiments, the PVC resins may be in the form of a plastisol or a dry blend. Further, in some embodiments, the compositions of this disclosure can include virgin PVC, recycled PVC, such as PVC recycled from various roofing products, and combinations of virgin and recycled PVC.

In one embodiment, the PVC resins in this disclosure have inherent viscosities as determined by ASTM D1243 ranging from about 0.50 to about 1.60 dl/g, or more, for example, about 0.65 to about 1.40 dl/g, for example, about 0.83 to about 1.00 dl/g.

In one embodiment, the polyvinyl chloride resins have a Tg from about 75° C. to about 80° C. In one embodiment, the polyvinyl chloride resin has a heat deflection temperature (HDT) from about 50° C. to about 75° C.

In one aspect of the present disclosure, when the Tg of the copolyester is greater than about 90° C., the Tg of the PVC resin composition will increase and the HDT of the composition will improve.

For example, in some embodiment the polyvinyl chloride articles made using the compositions of the present disclosure have a Tg up to 110° C. or a HDT of up to 130° C. while maintaining impact strength. In some embodiments, the articles have an increase in Tg and HDT of at least 3° C. while maintaining impact strength.

In some embodiments, the ratio of PVC resin:copolyester on a weight fraction basis is greater than about 1.

Fibrous Materials and Glass Fibers

The fibrous materials can be formed of any material suitable for the formation of a fiber reinforced article. For example, in one embodiment the fibrous materials can be polymer resins, including synthetic or natural polymers, capable of being formed into fibrous materials. Examples of suitable synthetic polymers useful in the present disclosure include without limitation polyesters, including polyethylene terephthalate (PET), polyethylene naphthalate (PEN), polytrimethylene terephthalate (PTT), poly(1,4-cyclohexylene dimethylene terephthalate) (PCT), and aliphatic polyesters such as polylactic acid (PLA); polyamides, including nylon 6 and nylon 6,6; polyolefins, including polypropylene, polyethylene, polybutene, and polymethyl pentene; acrylics; cellulose based materials such as cellulose acetate; and the like, as well as co- and ter-polymers of these and other suitable polymers, and combinations thereof. Other exemplary fibrous materials suitable for use in the present disclosure include, without limitation, fiberglass, glass fibers, carbon fibers, boron fibers, whisker, metallic fibers, inorganic fibers, aramid fibers, basalt fibers, mineral fibers, and the like, and combinations thereof. Exemplary mineral fibers include Wollastanite fibers, fiberglass, and mineral wool. Exemplary whisker includes silicon nitride whisker, silicon trinitride whisker, magnesium sulfate whisker, barium titanate whisker, silicon carbide whisker and boron whisker. Exemplary metallic fibers include fibers of soft steel, stainless steel, steel and alloys thereof, brass, aluminum and alloys thereof and lead. Exemplary inorganic fibers include various fibers of rock wool, zirconia, alumina silica, potassium titanate, barium titanate, titanium oxide, silicon carbide, alumina, silica and blast furnace slag.

In one embodiment, glass fibers are used as the fibrous material. Exemplary glass fibers include ordinary glass fibers as well as glass fibers coated with metals such as nickel and copper, or silane treated glass fibers. Other examples of the glass fibers suitable for use in the present disclosure include filaments obtained by melt-spinning glass such as E glass (electrical glass), C glass (chemical glass), A glass (alkali glass), S glass (high strength glass), M glass (modulus or high stiffness), D glass (low dielectric glass), E-CR glass (electrical/chemical resistant), R glass (reinforcement glass), T glass (thermal insulator glass), and alkali-proof glass.

In one embodiment, the glass fibers have a diameter of about 1 to about 25 μm, or from about 8 to about 20 μm. In one embodiment, the glass fibers have a length of about 0.1 to about 50.0 mm or from about 0.1 to about 25.0 mm. In another embodiment, the glass fibers have a length of about 0.4 to about 12.0 mm. In another embodiment, the glass fibers have a length of about 0.4 to about 4.0 mm. In another embodiment, the glass fibers have a length of about 4.0 to about 50.0 mm or from about 4.0 to about 25.0 mm. In another embodiment, the glass fibers are long fibers or greater than about 4 mm. In yet another embodiment, the glass fibers are short fibers or less than about 4 mm.

In one embodiment, the fiber reinforced polyvinyl chloride compositions of the present disclosure have a content of fibrous materials of up to about 65% by weight based on the total weight of the composition. In one embodiment, the fiber reinforced polyvinyl chloride compositions of the present disclosure have a glass fiber content of up to about 65% by weight based on the total weight of the composition. In one embodiment, the fiber reinforced polyvinyl chloride compositions of the present disclosure have a content of fibrous materials of up to about 40% by weight based on the total weight of the composition. In one embodiment, the glass fiber content is up to about 40% by weight based on the total weight of the composition. In one embodiment, the content of the fibrous materials is about 30% to about 65% or about 40% to about 65% by weight based on the total weight of the composition. In one embodiment, the content of the fibrous materials is greater than about 30% by weight based on the total weight of the composition. In one embodiment, the content of the fibrous materials is at least about 60% by weight based on the total weight of the composition. In another embodiment, the content of the fibrous materials is at least about 40% by weight based on the total weight of the composition. In one embodiment, the content of the fibrous materials is about 1% to about 65% by weight based on the total weight of the composition. In one embodiment, the glass fiber content is about 30% to about 65% or about 40% to about 65% by weight based on the total weight of the composition. In one embodiment, the glass fiber content is greater than about 30% by weight based on the total weight of the composition. In one embodiment, the glass fiber content is at least about 60% by weight based on the total weight of the composition. In another embodiment, the glass fiber content is at least about 40% by weight based on the total weight of the composition. In one embodiment, the glass fiber content is about 1% to about 65% by weight based on the total weight of the compositions. In one embodiment, the content of the fibrous materials is about 1% to about 40% by weight based on the total weight of the composition. In one embodiment, the content of the fibrous materials is about 30% to about 65% or about 40% to about 65% by weight based on the total weight of the composition. In one embodiment, the content of the fibrous materials is greater than about 30% by weight based on the total weight of the composition. In one embodiment, the content of the fibrous materials is at least about 60% by weight based on the total weight of the composition. In another embodiment, the content of the fibrous materials is at least about 40% by weight based on the total weight of the composition. In one embodiment, the content of the fibrous materials is about 1% to about 65% by weight based on the total weight of the composition. In one embodiment, the content of the fibrous materials is about 1% to about 40% by weight based on the total weight of the composition.

The fibrous materials and in some embodiments, the glass fibers, are incorporated into the PVC resins in the present disclosure to improve the physical properties such as tensile and flexural strength, tensile and flexural modulus, coefficient of linear thermal expansion and heat distortion temperature. The present disclosure uses copolyesters to facilitate the incorporation of the fibrous materials into the PVC compositions.

In some embodiments, when the fibrous materials and copolyesters are added at the appropriate concentrations to PVC compositions, the resulting compositions have increased tensile strength and modulus as determined by ASTM D638 and increased flexural strength and modulus as determined by ASTM D790.

The copolyesters in the present disclosure are miscible in PVC and are also compatible with the fibrous materials, including in some embodiments, glass fibers. The term "miscible" refers to blends of two or more polymers that are homogenous on molecular level and behave as a single-phase mixture, exhibiting only one glass transition temperature (Tg).

The copolyesters in the present disclosure "wet out" the fibrous materials and enable incorporation of the fibrous materials into the PVC compositions; and when properly incorporated the fibrous materials improve the physical properties of the PVC compositions. Without being bound by any theory, the copolyesters of the present disclosure "wet out" the fibrous materials including in some embodiments, the glass fibers due to the higher surface energies of copolyesters of the present disclosure.

The resulting fiber reinforced PVC compositions disclosed herein can be processed on any standard PVC processing equipment, at any standard PVC processing temperatures (about 170° C. to about 230° C.), and using any standard PVC processing methods such as extrusion, injection molding, profile extrusion and sheet extrusion.

In some embodiments, the copolyesters of the present disclosure have Tg's from about 55° C. to about 120° C. In some embodiments, the copolyesters of the present disclosure have Tg's of at least about 60° C. and higher. In some embodiments, the copolyesters of the present disclosure have Tg's of at least about 90° C. and higher. In some embodiments, the copolyesters of the present disclosure have Tg's of at least about 100° C. and higher. In some embodiments, the copolyesters of the present disclosure have Tg's of at least about 110° C. and higher.

In some instances, the bonding between the fibrous materials and the copolyesters can depend on the surface composition, structure and properties of the fibrous materials and the copolyesters.

In some instances, the bonding between the glass fibers and the copolyesters can depend on the surface composition, structure and properties of the glass fibers and the copolyesters.

For example, in some embodiments, chemical surface treatments are used on the glass fibers to decrease the polar nature of the glass fibers to allow them to wet out on lower surface energy polymers. In some embodiments, these chemical surface treatments involve the use of organosilanes. The Si—OH functionality of the organosilane adheres to the glass fiber and the organic component of the organosilane is more compatible with the polymer matrix. The surface energies are often measured through microscopic contact angle measurements (goniometry) of a polar liquid, typically water, and a less-polar liquid such as hexane or diiodomethane.

For higher adhesion properties, a material must 'wet out' the surface to be bonded. To 'wet out' means that the material flows and covers the surface to maximize the contact area and the attractive forces between the material and the bonding surface. In most instances, a lower surface energy material, such as water, will wet out a higher energy surface.

In some instances, for a material to wet out a surface, the surface energy of the material must be as low as or lower than the surface energy of the substrate to be bonded. Alternatively, the surface energy of the substrate could be raised. In certain aspects of the present disclosure, it is easier for the higher surface energy copolyesters to wet out the glass fibers than lower surface energy polymers such as polyolefins and PVC.

In another aspect of the present disclosure, during the wetting out and processing of the glass fibers having a lower viscosity polymer matrix prevents damage or breakage of the glass fibers during processing. Many plastics reinforced with glass fibers use crosslinkable thermoset materials like epoxies or vinyl esters because they are in liquid form and ease the impregnation and wetting of the fiber bundles to address these concerns. These crosslinking materials are not required in certain embodiments of the present disclosure. Typically, thermoplastic glass filled materials have utilized crystalline polymers such as nylon 6 and 6,6 and polybutylene terephthalate which have low melt viscosities at standard processing temperatures, and thus wetting out the glass fibers more readily and minimizing glass breakage during processing. The copolyesters used in certain embodiments of the present disclosure, do not have distinct melting points but instead will undergo a decrease in viscosity as the processing temperatures increase past its glass transition temperature. Lower viscosity copolyesters can be obtained by using copolyesters with lower molecular weights.

In one embodiment of the present disclosure, the copolyesters have a viscosity range of about 1,000 to about 1,000,000 poise measured at a temperature of about 170° C. to about 200° C. and at a shear rate of 10 $s^{-1}$, or from about 10,000 to about 500,000 poise or from about 20,000 to about 300,000 poise. The viscosity measurements in this aspect of the invention are made by performing small amplitude oscillatory shear (SAOS) experiments using a Rheometrics RDA II rheometer and performing frequency sweeps over the range of 1 to 400 s–1 at multiple temperatures above the Tg as determined by ASTM D4440. In some embodiments, the viscosities are measure at the PVC processing temperatures of about 170 to about 230° C.

In one embodiment of the present disclosure, copolyesters have a crystallization half time of greater than about 5 minutes, a glass transition temperature of at least about 60° C. or higher, a viscosity range of about 1,000 to about 1,000,000 poise measured at a temperature of about 170° C. to about 230° C. and at a shear rate of 10 $s^{-1}$, and a surface energy of equal to or greater than about 40 dynes per cm and are combined with fibrous materials at a fibrous material content of up to about 65% by weight based on the total weight of the composition. The surface energy measurements in this disclosure are determined by ASTM D7490.

In another embodiment of the present disclosure, copolyesters have a crystallization half time of greater than about 5 minutes, a glass transition temperature of at least about 90° C. or higher and a viscosity range of about 1,000 to about 1,000,000 poise measured at a temperature of about 170° C. to about 230° C. and at a shear rate of 10 $s^{-1}$, and a surface energy of equal to or greater than about 40 dynes per cm are about combined with fibrous material at a fibrous material content of at least about 40% by weight based on the total weight of the composition.

In one embodiment, the copolyesters are added to PVC compositions to create compositions of about 1% to about 40% fibrous material content, or about 1% to about 65% fibrous material content based on the total weight of the composition. In some embodiments, the polyvinyl chloride compositions are rigid.

In one embodiment of the present disclosure, copolyesters have a crystallization half time of greater than about 5 minutes, a glass transition temperature of at least about 60° C. or higher, a viscosity range of about 1,000 to about 1,000,000 poise measured at a temperature of about 170° C. to about 230° C. and at a shear rate of 10 $s^{-1}$, and a surface energy of equal to or greater than about 40 dynes per cm and are combined with glass fibers up to about 65% by weight based on the total weight of the composition. The surface energy measurements in this disclosure are determined by ASTM D7490.

In another embodiment of the present disclosure, copolyesters have a crystallization half time of greater than about 5 minutes, a glass transition temperature of at least about 90° C. or higher and a viscosity range of about 1,000 to about 1,000,000 poise measured at a temperature of about 170° C. to about 230° C. and at a shear rate of 10 $s^{-1}$, and a surface energy of equal to or greater than about 40 dynes per cm are about combined with glass fibers at a glass fiber content of at least about 40% by weight based on the total weight of the composition.

In one embodiment, the copolyesters are added to PVC compositions to create compositions of about 1% to about 40% glass fiber content, or about 1% to about 65% glass fiber content based on the total weight of the composition. In some embodiments, the polyvinyl chloride compositions are rigid.

In some embodiments, the PVC resins are combined with other additives such as processing aids, plasticizers, stabilizers, impact modifiers, biocides, flame retardants, foaming agents, blowing agents, thermal stabilizers, UV stabilizers, UV absorbers, minerals, pigments, dyes, colorants, fibers, fillers, waxes, fusion promoters, antioxidants, antistatic agents, release agents, lubricants, additional resins, heat distortion temperature modifiers and possibly other additives.

One embodiment of the present disclosure is a method of producing a fiber reinforced polyvinyl chloride composition comprising: compounding fibrous materials with a miscible admixture of at least one polyvinyl chloride resin and at least one copolyester which comprises: (a) a dicarboxylic acid component comprising: (i) about 90 to about 100 mole % of terephthalic acid residues; (ii) about 0 to about 10 mole % of aromatic and/or aliphatic dicarboxylic acid residues having up to 20 carbon atoms; and (b) a glycol component comprising: (i) about 20 to about 60 mole % of a modifying glycol consisting of 2 to 20 carbon atoms and (ii) about 40 to about 80 mole % of a second modifying glycol consisting of 2 to 20 carbon atoms, to produce a viscous thermoplastic material, extruding the compound through a die to produce pellets; and introducing the pellets into a calendering, extrusion or injection molding process to produce polyvinyl chloride articles.

Another embodiment of the present disclosure is a method of producing a fiber reinforced polyvinyl chloride composition comprising: compounding glass fibers with at least one copolyester which comprises: (a) a dicarboxylic acid component comprising: (i) about 90 to about 100 mole % of terephthalic acid residues; (ii) about 0 to about 10 mole % of aromatic and/or aliphatic dicarboxylic acid residues having up to 20 carbon atoms; and (b) a glycol component comprising: (i) about 20 to about 60 mole % of a modifying glycol consisting of 2 to 20 carbon atoms and (ii) about 40 to about 80 mole % of a second modifying glycol consisting of 2 to 20 carbon atoms, to produce a viscous thermoplastic material, mixing the compounded composition with a polyvinyl chloride resin to create a polyvinyl chloride composition of about 1 to about 65% glass fiber content based on the total weight of the composition; extruding the polyvinyl chloride composition through a die to produce pellets; and introducing the pellets into a calendering, extrusion or injection molding process to produce polyvinyl chloride articles.

One embodiment of the present disclosure is a method of producing a fiber reinforced polyvinyl chloride composition comprising: compounding fibrous materials with a miscible admixture of at least one polyvinyl chloride resin and at least one copolyester which comprises: (a) a dicarboxylic acid component comprising: (i) about 50 to about 100 mole % of terephthalic acid residues; (ii) about 0 to about 50 mole % of aromatic and/or aliphatic dicarboxylic acid residues having up to 20 carbon atoms; and (b) a glycol component comprising: (i) about 60 to about 100 mole % of a modifying glycol consisting of 2 to 20 carbon atoms and (ii) about 0 to about 40 mole % of a second modifying glycol consisting of 2 to 20 carbon atoms, to produce a viscous thermoplastic material, extruding the compound through a die to produce pellets; and introducing the pellets into a calendering, extrusion or injection molding process to produce polyvinyl chloride articles.

Another embodiment of the present disclosure is a method of producing a fiber reinforced polyvinyl chloride composition comprising: compounding glass fibers with at least one copolyester which comprises: (a) a dicarboxylic acid component comprising: (i) about 50 to about 100 mole % of terephthalic acid residues; (ii) about 0 to about 50 mole % of aromatic and/or aliphatic dicarboxylic acid residues having up to 20 carbon atoms; and (b) a glycol component comprising: (i) about 60 to about 100 mole % of a modifying glycol consisting of 2 to 20 carbon atoms and (ii) about 0 to about 40 mole % of a second modifying glycol consisting of 2 to 20 carbon atoms, to produce a viscous thermoplastic material, mixing the compounded composition with a polyvinyl chloride resin to create a polyvinyl chloride composition of about 1 to about 65% glass fiber content based on the total weight of the composition; extruding the polyvinyl chloride composition through a die to produce pellets; and introducing the pellets into a calendering, extrusion or injection molding process to produce polyvinyl chloride articles.

In some embodiments, the fiber reinforced PVC compositions of the present disclosure are used to make articles such as films, sheets, profiles or injection molded articles and parts.

The compositions of this disclosure are useful as molded plastic parts or as solid plastic objects. In some embodiments, the films, sheets, profiles, and injection molded articles and parts can be made using any extrusion process including extrusion processes whereby pellets are either blended together (when using concentrated ingredients) or added directly to an extruder (when using a fully compounded composition). In some embodiments, the films, profiles and sheets can be made using any calendering process.

In some embodiments, melt processing of the compositions of the present disclosure involves extrusion using any equipment known in the art including, without limitation, twin screw extruders, single screw extruders, high intensity batch mixers, Banbury mixers, Brabender mixers, roll mills, ko-kneaders or planetary gear extruder. The shear energy during the mixing is dependent on the combination of equipment, blade design, rotation speed (rpm), and mixing time. The shear energy should be sufficient to disperse the fibrous materials throughout the copolyester.

In some embodiments, the fibrous materials, copolyesters, polyvinyl chloride resins and additives can be combined in any order during the process. In one embodiment, the fibrous materials are premixed with the copolyesters and/or other additives. Next, the copolyesters containing the fibrous materials are then mixed with the polyvinyl chloride resin and/or other additives.

The disclosure further relates to articles of manufacture comprising the film(s) and/or sheet(s) containing polyvinyl chloride compositions described herein. In embodiments, the films and/or sheets of the present disclosure can be of any thickness which would be apparent to one of ordinary skill in the art.

The disclosure further relates to the molded articles described herein. The methods of forming the poly vinyl chloride compositions into molded articles can include any known methods in the art. Examples of molded articles of the disclosure including but not limited to injection molded articles, and extrusion articles such as sheet, film, or profiles. Methods of making molded articles include but are not limited to injection molding and extrusion.

The compositions of the copolyesters and fibrous materials (or glass fibers) of the present disclosure can be made into pellets using any standard procedure.

For example, the pellets of present disclosure can be made the following ways. In one embodiment, the copolyesters and fibrous materials (or glass fibers) can be combined using a twin screw compounding line. The copolyester pellets and fibrous materials (or glass fibers) are fed separately, or together, into the throat of the extruder. The copolyester melts and combines with the fibrous materials (or glass fibers) to produce a viscous, reinforced thermoplastic material.

In one embodiment, the copolyesters and the fibrous materials (or glass fibers) can be mixed using loss-in-weight feeders. The rotation of the two screws melts the copolyesters and mixes with the fibrous materials (or glass fibers). The mixtures are then extruded through a die to produce multiple strands. The strands can be fed through a water trough to cool the pellets. Upon exiting the water trough, the strands are dried and fed into a dicer to cut the strands into pellets. Alternatively, the mixture can be extruded through a circular flat plate die with multiple openings into water. The flat plate die has a rotating cutter that slices the strands as they extrude from the die to produce pellets. The continuous flow of water cools the pellets and transports them to a drying section, typically a centrifuge is then used to separate the pellets from the water.

In one embodiment, the copolyesters and fibrous materials (or glass fibers) can be combined using as a two-rotor continuous compounding mixer (such as a Farrell Continuous Mixer). The fibrous materials (or glass fibers) be fed into the throat of the extruder and melted to produce a viscous thermoplastic material. The copolyesters can be pre-blended with the fibrous materials (or glass fibers) and added to the extruder with a loss-in-weight feeder. The output rate of the mixer is controlled by varying the area of a discharge orifice. The melt can be sliced off into 'loaves' and fed to a two roll mill or the throat of a single screw extruder. In the case of the melt being fed to a two-roll mill, the melt covers one of the rolls and strip can be fed to the throat of a single screw extruder. The mixture is then extruded through a die to produce multiple strands. The strands can be fed through a water trough to cool the pellets. Upon exiting the water trough, the strands are dried and fed into a dicer to cut the strands into pellets. Alternatively, the mixture can be extruded through a circular flat plate die with multiple openings into water. The flat plate die has a rotating cutter that slices the strands as they extrude from the die to produce pellets. The continuous flow of water cools the pellets and transports them to a drying section, typically a centrifuge to separate the pellets from the water. In the case of the 'loaves' being fed to a single screw extruder, the mixture is extruded through a die to produce multiple strands. The strands can be fed through a water trough to cool the pellets. Upon exiting the water trough, the strands are dried and fed into a dicer to cut the strands into pellets. Alternatively, the mixture can be extruded through a circular flat plate die with multiple openings into water. The flat plate die has a rotating cutter that slices the strands as they extrude from the die to produce pellets. The continuous flow of water cools the pellets and transports them to a drying section, typically a centrifuge to separate the pellets from the water.

In some embodiments, the copolyester and fibrous materials (or glass fibers) compositions can be combined in a plastics compounding line such as a Banbury batch type mixer. In these embodiments, the copolyesters and fibrous materials (or glass fibers) can be fed into the Banbury—type high-intensity mixer and a ram lowered to compress the mixture into the mixing chamber. Two rotating mixer blades melt the pellets and melt the copolyester and fibrous materials (or glass fibers). When the desired temperature is reached, a door is opened in the bottom of the mixer and the mixture is dropped two a two roll mill. A ribbon from the two roll mill can then be fed to a single screw extruder. The mixture is then extruded through a die to produce multiple strands. The strands can be fed through a water trough to cool the pellets. Upon exiting the water trough, the strands are dried and fed into a dicer to cut the strands into pellets. Alternatively, the mixture can be extruded through a circular flat plate die with multiple openings into water. The flat plate die has a rotating cutter that slices the strands as they extrude from the die to produce pellets. The continuous flow of water cools the pellets and transports them to a drying section, typically a centrifuge to separate the pellets from the water.

The present disclosure envisions combining the aforementioned copolyester/fibrous materials (or glass fibers) composition with a PVC composition in melt-based processes, as follows: one embodiment entails first combining the copolyester fibrous materials (or glass fibers) composition with PVC to produce a pellet, using single screw, twin screw, or other compounding techniques well established in the art. This reinforced PVC pellet can then be used to produce useful articles in a second step, using other melt-based processes such as injection molding, sheet or film extrusion, calendering, extruded profiles, or other methods well established in the art.

Another embodiment of the disclosure consists of directly combining the copolyester/fibrous materials (or glass fibers) composition and a PVC composition to produce a flat sheet or profile using an extrusion process—all in a single step. In one embodiment, this can be accomplished several ways by separately adding the copolyester/fibrous materials (or glass fibers) composition as described above and added separately to the throat of a single or twin screw extruder. In another embodiment, a blend of the copolyester/fibrous materials (or glass fibers) composition and PVC composition can be preblended and added to the throat of a single or twin screw extruder. The blended mixture in some embodiments is conveyed and compressed by the screw(s) down the extruder barrel to melt the mixture and discharge the melt from the end of the extruder. The melt can then be fed through a die to create a continuous flat sheet or an into a profile die to create a continuous shape. In the embodiments using the flat sheet die, the melt is extruded onto a series of metal rolls, typically three, to cool the melt and impart a finish onto the sheet. The flat sheet is then conveyed in a continuous sheet to cool the sheet. It can then be trimmed to the desired width and then either rolled up into a roll or sheared or sawed into sheet form. A flat sheet can also be formed into a shape through mechanical means to form a desired shape and then cooled either by spraying with water, through a water trough or by blowing air on the profile. It can then be sawed or sheared to the desired length.

In embodiments using a profile die, the die is designed to produce the desired shape of the article. After exiting the die, it can then be cooled either by spraying with water, through a water trough or by blowing air on the profile. It can then be sawed or sheared to the desired length.

Another embodiment of the disclosure consists of combining a copolyester/fibrous material (or glass fibers) composition and a PVC composition to produce an injection molded article. This can be accomplished several ways by separately adding the copolyester/fibrous materials (or glass fibers) composition as described above and added separately to the throat of the injection molding machine. In another embodiment, a blend of the copolyester/fibrous materials (or glass fibers) composition and PVC composition can be preblended and added directly to the throat of the injection molding machine. The blended mixture, in some embodiments, is conveyed and compressed by the screw(s) down the extruder barrel to melt the mixture and discharge the melt from the end of the extruder. Once the pellets reach the desired temperature, a gate is opened at the end of the extruder and the melted plastic is pumped by the screw into a heated mold to form an article of the desired shape. Once the mold is filled, a coolant is pumped through the mold to cool it and the melted plastic. Once the plastic has solidified, the mold is opened and the article is removed from the mold.

Useful applications for these fiber reinforced PVC compositions can include many building and construction applications such as corner profiles, decking, fencing, railings, window profiles and other interior and exterior applications.

Other applications for these fiber reinforced PVC compositions can include uses in appliances, electrical and electronic enclosures, sign enclosures, automotive applications, aircraft interiors, and other high temperature applications where rigid PVC formulations have been limited due to their lower tensile strength and modulus and flexural strength and modulus.

For example, in some embodiments, the PVC articles of this disclosure are used in the following applications: building and construction, corner profiles, decking, fencing, railings, soffits, vinyl siding, cladding, window profiles, door frames, siding, fences, gutters, pipes, piping, electrical and electronic enclosures, electrical junction boxes, automobile interiors and exteriors, appliances, office equipment, sign enclosures, medical devices, aircraft interiors, and other high temperature applications. In some embodiments, the polyvinyl chloride articles are rigid.

This disclosure can be further illustrated by the following examples, although it will be understood that these examples are included merely for purposes of illustration and are not intended to limit the scope of the disclosure unless otherwise specifically indicated.

EXAMPLES

The following tables summarize the experimental results of the disclosure and counter examples:

TABLE 1

| Description | % Glass | % Copolyester | % PVC | Material | Tensile Strength (psi) | Tensile Modulus (psi × $10^6$) | Max Strain at break % | Flexural Strength (psi) | Flexural Modulus (psi × $10^6$) | Unnotched IZOD (ft-lbs/in) | HDT (at 1.8 MPa) |
|---|---|---|---|---|---|---|---|---|---|---|---|
| Regrind PVC | 0 | | 100% | 0% LGF | 6,489 | 0.344 | 4.159 | 11,042 | 0.386 | DNE | |
| 33% LGF60- Eastar™ 5011 NAT + 67% PVC | 19.8 | 13.2 | 67 | 20% LGF, Eastar 5011 | 10,374 | 0.890 | 1.517 | 14,724 | 0.872 | 5.6 | |
| 66% LGF60 - Eastar 5011 NAT + 34% PVC | 39.6 | 26.4 | 34 | 40% LGF, Eastar 5011 | 12,189 | 1.551 | 1.056 | 17,456 | 1.503 | 4.5 | |
| 33% LGF60 -Embrace™ LV NAT + 67% PVC | 19.8 | 13.2 | 67 | 20% LGF, Embrace LV | 10,696 | 0.949 | 1.464 | 15,195 | 0.949 | 5.8 | |
| 66% LGF60 - Embrace LV NAT + 34% PVC | 39.6 | 26.4 | 34 | 40% LGF, Embrace LV | 12,446 | 1.571 | 1.042 | 17,842 | 1.498 | 4.6 | |
| 66% LGF60 - Tritan™ TX1500 + 34% PVC | 39.6 | 26.4 | 34 | 40% LGF, Embrace LV | 13,256 | 1.080 | 2.093 | 18,591 | 1.609 | 6.0 | 85 |
| 33% LGF60 - Tritan TX1500 + 67% PVC | 19.8 | 13.2 | 67 | 20% LGF, Embrace LV | 11,349 | 0.738 | 2.489 | 16,976 | 1.062 | 6.7 | 78 |

Table 1 is a summary of the physical property data for PVC compositions with and without various levels of glass fiber reinforced copolyester pellets. A blend of 60% long glass fibers and 40% of three different copolyester resins, Embrace™ LV, Eastar™ 5011, and Tritan™ TX1500, were prepared using a pultrusion-type of process, where continuous glass fiber strands were pulled through a cross-head die containing said copolyester. In a second step, PVC composite samples were then prepared by adding the glass reinforced copolyester pellets to the rigid PVC composition at two different levels to produce samples with 20% and 40% glass fibers content in the final composition. Bars of the final compositions were injection molded into samples and these samples were tested for the following physical properties: tensile properties (ASTM D638), flexural properties (ASTM D790), unnotched IZOD strength (ASTM D256), and in some examples HDT (ASTM D 648 at 1.8 MPa test condition).

The physical property test results show that each of the compositions with approximately 20% glass fiber increased the properties of the unfilled PVC as follows:

Tensile strength increased by about 60-75%

Tensile modulus increased by about 110-180%

The flexural strength increased by about 30-55%

The flexural modulus increased by about 125-175%

The physical property test results show that each of the compositions with approximately 40% glass fiber increased the properties of the unfilled PVC as follows Tensile strength increased by about 85-105%

Tensile modulus increased by about 200-350%

The flexural strength increased by about 55-70%

The flexural modulus increased by about 285-315%

The HDT was measured for some of the copolyesters with a Tg greater than 90° C. In some of these examples, the resulting compositions showed a significant boost in HDT when the Tritan™ copolyester (TX1500) was added to the blends. Unfilled rigid PVC typically has an HDT of 70-75° C. at the highest range. In these examples, the Tritan copolyester in combination with 20 and 40% glass fiber respectively enabled HDT values of 78 and 85° C. (or a 3-10° C. increase over standard rigid PVC formulations). Without being bound by any theory, the Tritan copolyester (TX1500) in these examples, seems to serve as a glass compatibilizer and an HDT booster, because of the higher glass transition temperature (Tg) of the Tritan resin (Tg ~110° C.).

TABLE 2

| | Dispersive SE dynes/cm | Polar SE dynes/cm | Total SE dynes/cm |
|---|---|---|---|
| Tritan™ TX2000 | 39.5 | 3.6 | 43.1 |
| Eastar™ 5011 | 43.6 | 4.1 | 47.7 |
| Embrace™ LV | 45.3 | 3.3 | 48.6 |
| Rigid PVC Literature | | | 39 |

Table 2 summarizes the surface energy data determined by contact angle measurements using a goniometer and a literature value for rigid PVC. The data shows that the three copolyester resins tested, Tritan™ TX2000, Embrace™ LV and Eastar™ 5011, all have surface energies greater than rigid PVC. The higher surface energies for the copolyester resins indicates that the copolyesters will wet out the glass fibers more readily that rigid PVC alone because the rigid PVC has a lower surface energy.

TABLE 3

Rheology Data

| Material | Temperature | Viscosity at 1 rad/s (Poise) | Viscosity at 400 rad/s (Poise) | Viscosity at 10 rad/s (Poise) |
|---|---|---|---|---|
| Rigid PVC | 170 | 593,056 | 6,586 | 108,759 |
| Rigid PVC | 180 | 352,838 | 6,489 | 82,027 |
| Rigid PVC | 190 | 221,955 | 6,325 | 62,324 |
| Eastar™ 5011 | 170 | 119,470 | 19,138 | 93,455 |
| Eastar 5011 | 180 | 64,659 | 15,046 | 55,926 |
| Eastar 5011 | 190 | 37,286 | 11,719 | 34,271 |
| Embrace™ LV | 170 | 197,445 | 20,690 | 128,657 |
| Embrace LV | 180 | 119,654 | 17,278 | 86,156 |
| Embrace LV | 190 | 75,871 | 14,396 | 59,148 |
| Tritan™ TX2000 | 170 | 3,349,960 | 46,842 | 839,097 |
| Tritan TX2000 | 180 | 1,721,570 | 40,267 | 591,415 |
| Tritan TX2000 | 190 | 868,995 | 34,978 | 398,428 |
| Tritan TX2000 | 220 | 126,017 | 20,476 | 100,357 |
| Tritan TX2000 | 240 | 45,052 | 13,497 | 41,440 |
| Tritan TX1500 | 170 | 746,841 | 28,612 | 384,575 |
| Tritan TX1500 | 180 | 383,803 | 24,901 | 249,083 |
| Tritan TX1500 | 190 | 204,249 | 21,546 | 154,945 |
| Tritan TX1500 | 220 | 39,032 | 12,637 | 36,195 |
| Tritan TX1500 | 240 | 15,372 | 7,897 | 14,845 |

Table 3 illustrates the viscosity data at 170° C., 180° C. and 190° C. at various shear rates (1, 10, and 400 $s^{-1}$) determined using parallel plate rheometry for Tritan™ TX2000, Tritan TX1500, Embrace™ LV, Eastar™ 5011 and a rigid PVC composition. The data shows the distinct differences in viscosity for the copolyester resins in contrast to PVC. As shown, Tritan TX2000 is the most viscous copolyester and Eastar 5011 is the least viscous. The viscosity of Eastar 5011 is closer to the viscosity of the rigid PVC composition. Each of these copolymers, Tritan TX2000, Tritan TX1500, Embrace LV, and Eastar 5011 act as carriers and compatibilizers for incorporating the glass fibers into rigid PVC. However, in instances where it is necessary to minimize glass fiber breakage during incorporation, lower viscosity copolyesters such as Eastar 5011 can be used. Based on the data in Table 3, it appears that copolyesters having viscosity values of 1,000 to 1,000,000 poise, measured at shear rates of 10 $s^{-1}$ and at PVC processing conditions (170-230° C.) are suitable for this invention.

What we claim:

1. A polyvinyl chloride composition comprising a polyvinyl chloride resin, fibrous materials and at least one copolyester which comprises:
    (a) a dicarboxylic acid component comprising:
        (i) about 90 to about 100 mole % of terephthalic acid residues;
        (ii) about 0 to about 10 mole % of aromatic and/or aliphatic dicarboxylic acid residues having up to 20 carbon atoms; and
    (b) a glycol component comprising:
        (i) about 20 to about 60 mole % of a modifying glycol consisting of 2 to 20 carbon atoms and
        (ii) about 40 to about 80 mole % of a second modifying glycol consisting of 2 to 20 carbon atoms,
wherein the total mole % of the dicarboxylic acid component is 100 mole %, and wherein the total mole % of the glycol component is 100 mole %; and wherein the copolyester is amorphous.

2. The polyvinyl chloride composition of claim 1, wherein the Tg of the copolyester is at least about 60° C. or higher.

3. The polyvinyl chloride composition of claim 1, wherein the Tg of the copolyester is at least about 90° C. or higher.

4. The polyvinyl chloride composition of claim 1, wherein the Tg of the copolyester is at least about 100° C. or higher.

5. The polyvinyl chloride composition of claim 1, wherein the copolyester has a crystallization half time of about 5 minutes or greater.

6. The polyvinyl chloride composition of claim 1, wherein the copolyester has a crystallization half time of about 10 minutes or greater.

7. The polyvinyl chloride composition of claim 1, wherein the fibrous materials are glass fibers.

8. The polyvinyl chloride composition of claim 1, wherein the fibrous materials are fiberglass, glass fibers, carbon fibers, boron fibers, whisker, metallic fibers, inorganic fibers, aramid fibers, basalt fibers, mineral fibers, and combinations thereof.

9. The polyvinyl chloride composition of claim 1, wherein the copolyester is about 1 to about 100 parts per hundred resin (phr) based on the content of the polyvinyl chloride resin in the composition.

10. The polyvinyl chloride composition of claim 7, wherein the glass fiber content is up to about 65% by weight based on the total weight of the composition.

11. The polyvinyl chloride composition of claim 7, wherein the glass fiber content is up to about 40% by weight based on the total weight of the composition.

12. The polyvinyl chloride composition of claim 7, wherein the glass fiber content is about 40 to 65% by weight based on the total weight of the composition.

13. The polyvinyl chloride composition of claim 7, wherein the glass fiber content is about 30 to 65% by weight based on the total weight of the composition.

14. The polyvinyl chloride composition of claim 1, wherein the content of the fibrous materials is greater than about 30% by weight based on the total weight of the composition.

15. The polyvinyl chloride composition of claim 7, wherein the glass fiber content is at least about 60% by weight based on the total weight of the composition.

16. The polyvinyl chloride composition of claim 1, wherein the content of the fibrous materials is about 1% to about 65% by weight based on the total weight of the composition.

17. The polyvinyl chloride composition of claim 1, wherein the ratio of PVC:copolyester on a weight fraction basis is greater than about 1.

18. The polyvinyl chloride composition of claim 1, wherein the content of the fibrous materials is at least about 40% by weight based on the total weight of the composition.

19. The polyvinyl chloride composition of claim 7, wherein the glass fibers are short fibers and have a length of less than about 4 mm.

20. The polyvinyl chloride composition of claim 7, wherein the glass fibers are long fibers and have a length of greater than about 4 mm.

21. The polyvinyl chloride composition of claim 7, wherein the copolyester has a viscosity range of about 1,000 poise to about 1,000,000 poise measured at a temperature of about 170° C. to about 230° C. and at a shear rate of 10 $s^{-1}$, and a surface energy of equal to or greater than about 40 dynes per cm, and wherein the glass fiber content is up to about 65% by weight based on the total weight of the composition.

22. The polyvinyl chloride composition of claim 1, wherein said polyvinyl chloride resin is a polyvinyl chloride resin, a chlorinated polyvinyl chloride resin, or alloys thereof.

23. The polyvinyl chloride composition of claim 1, wherein said composition further comprising at least one additive selected from the group consisting of processing aids, plasticizers, stabilizers, impact modifiers, biocides, flame retardants, foaming agents, blowing agents, thermal stabilizers, UV stabilizers, UV absorbers, minerals, pigments, dyes, colorants, fillers, fibers, waxes, fusion promoters, antioxidants, antistatic agents, release agents, lubricants, additional resins, and heat distortion temperature modifiers.

24. An article formed by melt-processing the polyvinyl chloride composition of claim 1.

25. The article of claim 24, wherein said melt processing involves calendering, injection molding or extrusion.

26. The article of claim 24, wherein said polyvinyl chloride resin is rigid.

27. The article of claim 24, wherein said article comprises films, sheets, profiles or injection molded parts.

28. Films, sheets, profiles and injection molded parts comprising the polyvinyl chloride compositions of claim 1.

29. An article of manufacture comprising the polyvinyl chloride compositions of claim 1.

* * * * *